(12) United States Patent
Brücher et al.

(10) Patent No.: US 8,226,366 B2
(45) Date of Patent: Jul. 24, 2012

(54) AXIAL ROTOR SECTION FOR A ROTOR OF A TURBINE

(75) Inventors: Marcus Brücher, Berlin (DE); Axel Buschmann, Essen (DE); Andreas Föhrigen, Berlin (DE); Dieter Kienast, Berlin (DE); Martin Raschnewski, Berlin (DE); Joachim Reisener, Berlin (DE); Wilfried Remmert, Berlin (DE); Peter Schröder, Essen (DE)

(73) Assignee: Siemens Aktiengesellschaft, München (DE)

( * ) Notice: Subject to any disclaimer, the term of this patent is extended or adjusted under 35 U.S.C. 154(b) by 1234 days.

(21) Appl. No.: 12/008,006

(22) Filed: Jan. 8, 2008

(65) Prior Publication Data
US 2008/0181768 A1    Jul. 31, 2008

(30) Foreign Application Priority Data
Jan. 9, 2007  (EP) .................................... 07000381

(51) Int. Cl.
*F03B 3/12* (2006.01)
(52) U.S. Cl. .................................. 416/221; 416/219 R
(58) Field of Classification Search .............. 416/214 R, 416/219, 220 R, 221, 219 R
See application file for complete search history.

(56) References Cited

U.S. PATENT DOCUMENTS 3,572,966 A * 3/1971 Borden et al. ................. 416/95

FOREIGN PATENT DOCUMENTS

| DE | 1963 364 | 7/1970 |
|---|---|---|
| DE | 30 33 768 A1 | 4/1981 |
| EP | 1840338 A1 | 10/2007 |
| FR | 2 524 933 | 10/1983 |
| JP | 48025686 A | 4/1973 |
| JP | 55054708 A | 4/1980 |
| JP | 2000153733 A | 6/2000 |

* cited by examiner

*Primary Examiner* — Dwayne J White

(57) ABSTRACT

Disclosed is an axial rotor section for a rotor of a turbine, on which a sealing element, which is provided on an end side surface, is secured by means of a bolt against movement in the circumferential direction, with the bolt being reliably secured against becoming loose by means of a securing plate. One particular advantage of the invention is the comparatively simple and low-cost design, comprising a securing plate, a bolt, holes and grooves. Furthermore, these components can be fitted and removed quickly, because of their simple geometry.

9 Claims, 6 Drawing Sheets

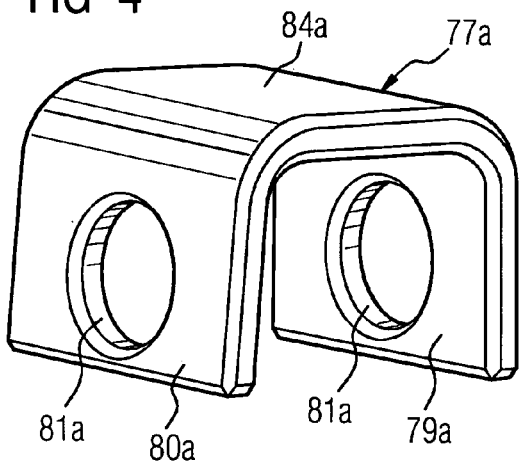
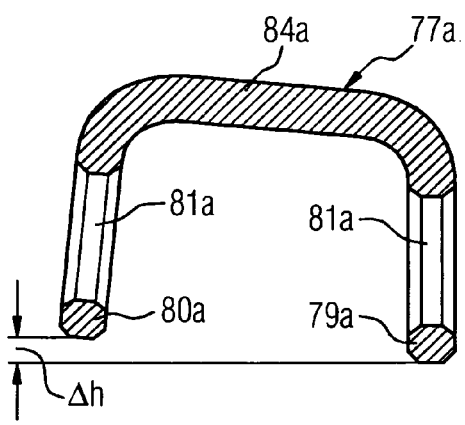
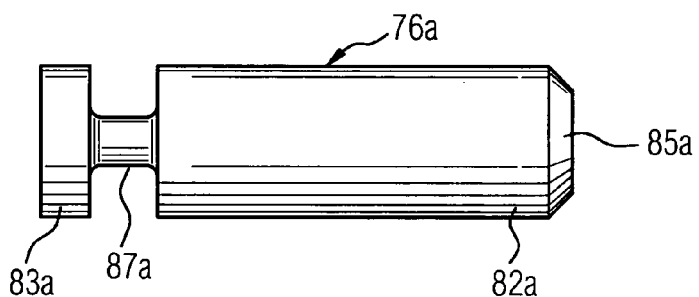
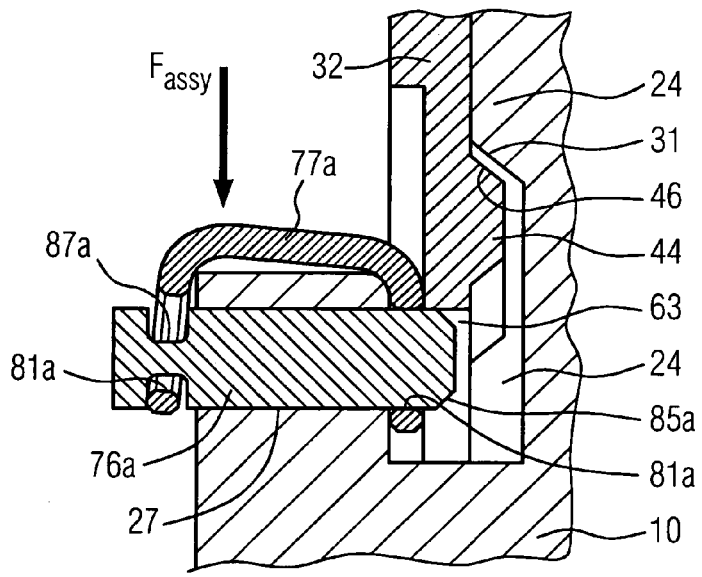

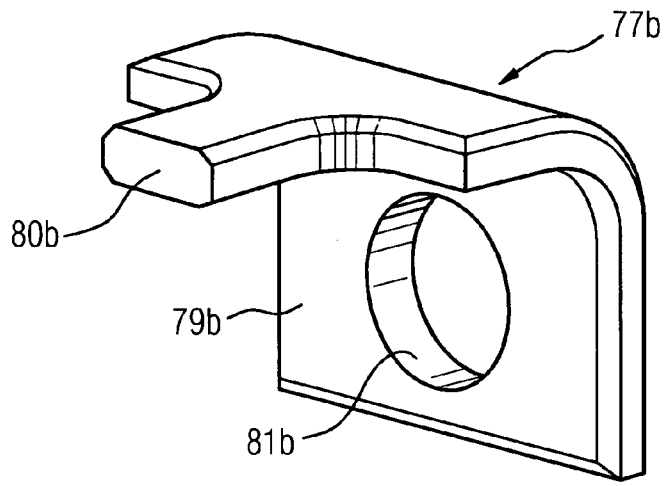
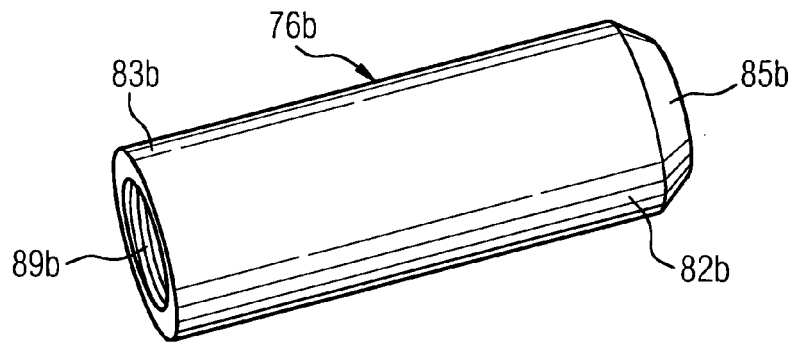
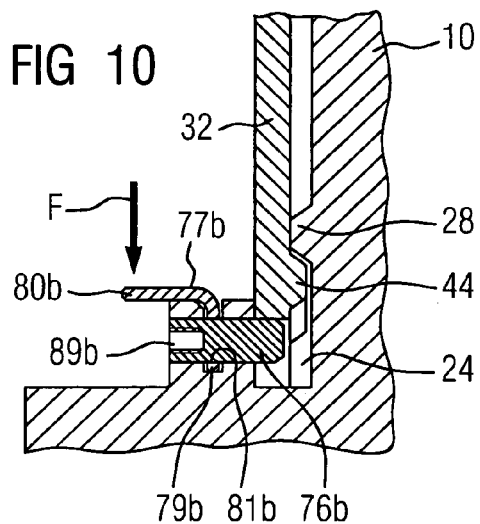
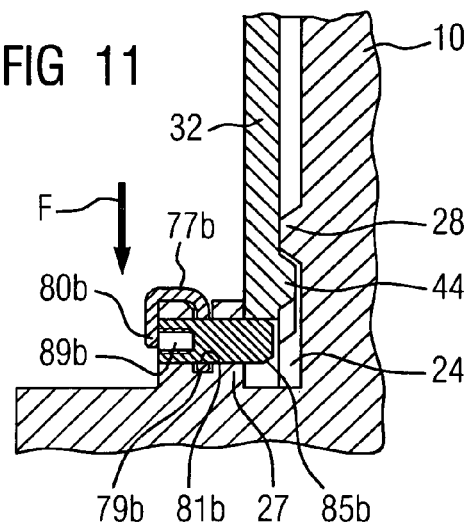

AXIAL ROTOR SECTION FOR A ROTOR OF A TURBINE

CROSS REFERENCE TO RELATED APPLICATIONS

This application claims the benefits of European application No. 07000381.9 filed Jan. 9, 2007 and is incorporated by reference herein in their entirety.

FIELD OF INVENTION

The invention relates to an axial rotor section for a rotor of a turbine, having an outer circumferential surface which is adjacent to two end first side surfaces, in which rotor blade holding grooves for rotor blades of the turbine, are distributed over the circumference and extend in the axial direction, and having a further circumferential surface which, radially further inwards, is adjacent to one of the two first side surfaces, in which further circumferential surface at least one sealing groove is provided, is open radially outwards, extends in the circumferential direction and has a plurality of sealing elements which are inserted therein and at least partially cover the end openings of the rotor blade holding grooves.

BACKGROUND OF THE INVENTION

An axial rotor section of this generic type for a turbine, and a rotor of this generic type, are disclosed, for example, in Laid-Open Specification DE 1 963 364. The rotor section is formed by a rotor disk and is equipped with holding grooves, which run in the axial direction, for the turbine rotor blades, with an endlessly circumferential holding groove for sealing plates being provided at the end. A plurality of projections are provided on one side wall of the retaining groove, are distributed uniformly in the circumferential direction and partially cover the groove base on the retaining groove. Furthermore, the laid-open specification discloses a sealing plate in the form of a plate which, adjacent to its inner edge that is arranged radially inwards, has a thickened area on both sides which corresponds approximately to the groove width of the retaining groove. The thickened area is in this case interrupted in places, viewed in the circumferential direction, by recesses which are designed with a width that corresponds to that of the projections of the retaining groove. In consequence, the sealing plate can be inserted into the retaining groove from the outside by a purely radial movement and, following a movement in the circumferential direction which corresponds approximately to the width of the projection, is hooked thereto. The thickened area of sealing plate then engages behind the projections on the retaining groove, so that the sealing plate cannot move outwards. In order to fit all the sealing plates, they are successively inserted into the retaining groove and only then can they be moved jointly in the circumferential direction. This avoids the need for a sealing plate lock. After insertion and movement of the sealing plates, the rotor blades are pushed into their grooves. The outer edge of the sealing plates are then pushed into grooves on the platform side of the rotor blades so that they are secured against axial movement. In order to complete the assembly process, the sealing plates are fixed in a raised position by means of a screw. Each widened area then rests on the projection. This arrangement of the components makes it possible to separate a first area, which is located between the sealing plate and the end face of the rotor disk, from a second area, which is located beyond the sealing plate, for guiding different media. In order to achieve particularly good sealing, the widened area of the sealing plate rests on that side wall of the retaining groove on which no projection is provided. Furthermore, an inner, conically running edge of the projection ensures that the sealing plate is pressed against that side wall of the retaining groove which has no projection, by the influence of centrifugal force.

One disadvantage of the known arrangement is the complex design of the side surfaces of the rotor disk and of the sealing plate, with projections and recesses. A further disadvantage is the use of a screw to secure the sealing plates against movement in the circumferential direction. Corrosion and strength problems can occur in the screw connection as a result of the alternating thermal stress that occurs between operation and shutdown and as a result of the hot gas flowing through the turbine. In some circumstances, this screw connection cannot be released correctly. In this situation, the screw is drilled out, with this process generally also being carried out on the rotor while it is still located in the lower housing half of the gas turbine. During this process, it is possible for swarf to fall into the lower housing half, which can lead to inadvertent contamination during subsequent operation.

Furthermore, FR 2 524 933 discloses a means for securing rotor blades against axial movement, with the rotor blades being held by means of a plate which can move in the circumferential direction. However, the arrangement disclosed in this document is not suitable for sealing an area close to the disk from an area beyond the plate.

Furthermore, laid-open specification DE 30 33 768 A1 discloses a rotor assembly for a rotor disk of a turbine which has an integral sealing ring in order to secure the rotor blades axially. However, because of the integral sealing ring, this is suitable only for aircraft gas turbines since these are formed by stacks in the axial direction. In contrast, stationary gas turbines are composed of two housing halves which surround the completely assembled rotor. The integral sealing ring in DE 30 33 768 A1 is hooked to the turbine disk in the form of a bayonet fitting. For this purpose, projections and recesses, which are distributed along the circumference, are arranged alternately both on the turbine disk and on the sealing ring. For assembly, the sealing ring is placed on the rotor disk, with the recesses and projections opposite one another. These can then be hooked to one another by slightly twisting the two parts with respect to one another.

SUMMARY OF INVENTION

The object of the invention is therefore to provide an axial rotor section for a stationary turbine and to provide a sealing element for a turbine rotor which is fitted with rotor blades, with an improvement to the installation and removal of the sealing elements and rotor blades.

This object is achieved by an axial rotor section having the features as claimed in the claims.

The inventive axial rotor section is distinguished in particular in that the means comprises a securing plate having at least one hole which is aligned with one of the holes in the side walls of the sealing groove, such that the bolt which is inserted into the respectively aligned holes secures the securing plate against becoming loose.

The invention therefore provides for the bolt which has been inserted into the holes to secure the securing plate and, conversely, for the securing plate to secure the bolt, against becoming loose. This makes it possible to secure the sealing elements against movement in the circumferential direction in a manner which allows them to be fitted and removed quickly and easily. The use of a bolt which is seated in a hole and is likewise interlocked to each sealing element associated with it makes it possible to specify a reusable component for securing the sealing elements. Only the securing plates are designed as a spare part for single use, thus making it possible to remove and fit rotor blades and sealing elements at low cost. Furthermore, the securing plates and bolts can be produced at low cost.

Advantageous refinements are specified in the claims.

According to a first advantageous development, a securing groove is provided in the further circumferential surface and is adjacent to the sealing groove, and in which the securing plates are inserted. Although the securing plates can also be arranged in the sealing groove, both the sealing elements and the securing plates can be placed considerably more easily and with less effort, however, according to the abovementioned refinement if a groove intended for this purpose is provided adjacent to the axial rotor section for each of the two elements. In the abovementioned case, the hole in which the bolt is inserted also extends through the side walls of the securing groove.

It is particularly advantageous to seat the securing plate in its own securing groove when the securing plate must be plastically deformed, that is to say bent around, during fitting. The side walls of the securing groove are particularly suitable for absorbing the forces which occur during this process.

The securing plate is preferably in the form of a plate and is provided with a radial extent in an operating position which is greater than the depth of the securing groove. In particular, the securing plate has a radial length such that, after insertion in the securing groove, it can be bent around the further circumferential surface until, in the bent-around state, it at least partially covers the hole which is arranged in the second side surface and through which the bolt has been inserted. By way of example, the securing plate may be formed by two plate limbs. One of the two plate limbs has a hole for holding the bolt, and the other plate limb is in the form of a tongue which can slightly cover the hole which is arranged in the side surface. In consequence, the tongue blocks the opening of the hole, so that the bolt is blocked. This can then not slide out of the hole even in response to the vibration which occurs during operation of the turbine. In order to remove the bolt, the sealing element and the rotor blade, the tongue provided on the securing plate just has to be bent back by means of a flat bar such that the opening of the hole in which the bolt is seated is released again. The bolt can then be removed through the opening.

In another advantageous refinement, one end of the bolt projects partially out of the hole in the second side surface so that this end can be connected to the securing plate with an interlock. By way of example, that end of the bolt which projects out of the rotor section is provided with at least one projection behind which the plate limb of the securing plate which covers the hole can engage. This ensures that the plate limb of the securing plate is firmly connected to the end of the bolt, further preventing the securing plates from being bent up in response to centrifugal force. In this refinement, the bolt is secured particularly reliably against inadvertently becoming loose.

The interlock may in this case be designed such that that plate limb of the securing plate which is connected to the projecting end of the bolt is forced against the second side surface by the influence of centrifugal force. A minimum friction force between the bolt and the securing plate must then be overcome in order to open the interlock, thus always reliably preventing the security plate from being bent up inadvertently during operation of the gas turbine.

In a further refinement of the securing plate, the securing plate is U-shaped with two freely ending plate limbs, with a hole for the respective bolt being provided in each of the plate limbs. The two holes are in this case not located exactly opposite one another. The U-shape of the securing plate is in this case designed such that, once it has been inserted into the sealing groove or securing groove, it can be operated resiliently in order that the holes in the securing plate as well as the hole provided in the second side surface can be moved to align them in order to allow the bolt to be inserted. The bolt is in this case provided at its end projecting out of the side surface with an annular groove into which one of the holes in the securing plate can be snapped. This refinement also allows self-securing attachment of the bolt to be achieved.

According to a further embodiment of the securing plate, the hole has an opening in the form of a keyhole with a smaller and a larger diameter, with the bolt having an external diameter which is larger than the smaller diameter of the keyhole and being provided with an endlessly circumferential annular groove in which the keyhole in the securing plate engages. In order to fit this securing means, the securing plate is first of all inserted into the securing groove, and the bolt is then inserted into the hole provided for this purpose. The securing plate is then raised outwards so that the smaller diameter of the keyhole engages in the endlessly circumferential annular groove on the bolt. The securing plate is then bent around the raised position in order to fix it in this position in this way. The outer end of the securing plate then rests on the further circumferential surface of the rotor section.

The rotor section is expediently formed by a rotor disk which may be one of the parts of the rotor of a turbine.

BRIEF DESCRIPTION OF THE DRAWINGS

The invention will be explained with reference to a drawing, in which:

FIG. 4 shows a perspective illustration of a first refinement of a securing plate, FIG. 5 shows a cross section through the securing plate shown in FIG. 4, FIG. 6 shows a bolt matched to the securing plate shown in FIG. 4, FIG. 7 shows the first refinement of the sealing element arranged in a sealing groove, secured by the bolt and the securing plate, FIG. 8 shows a perspective illustration of a second refinement of a securing plate, FIG. 9 shows a perspective illustration of the bolt associated with the securing plate shown in FIG. 8, FIGS. 10, 11 show cross-sectional illustrations of the assembly steps to secure the bolt against loss, according to the second refinement.

DETAILED DESCRIPTION OF INVENTION

Gas turbines and their methods of operation are generally known. The rotors of gas turbines may, for example, be formed from a plurality of rotor discs which are located adjacent to one another and are braced by one central tie rod, or by a plurality of off-center tie rods. Each rotor therefore comprises a plurality of rotor sections, each of which may be formed by a rotor disk.

Figure 1:
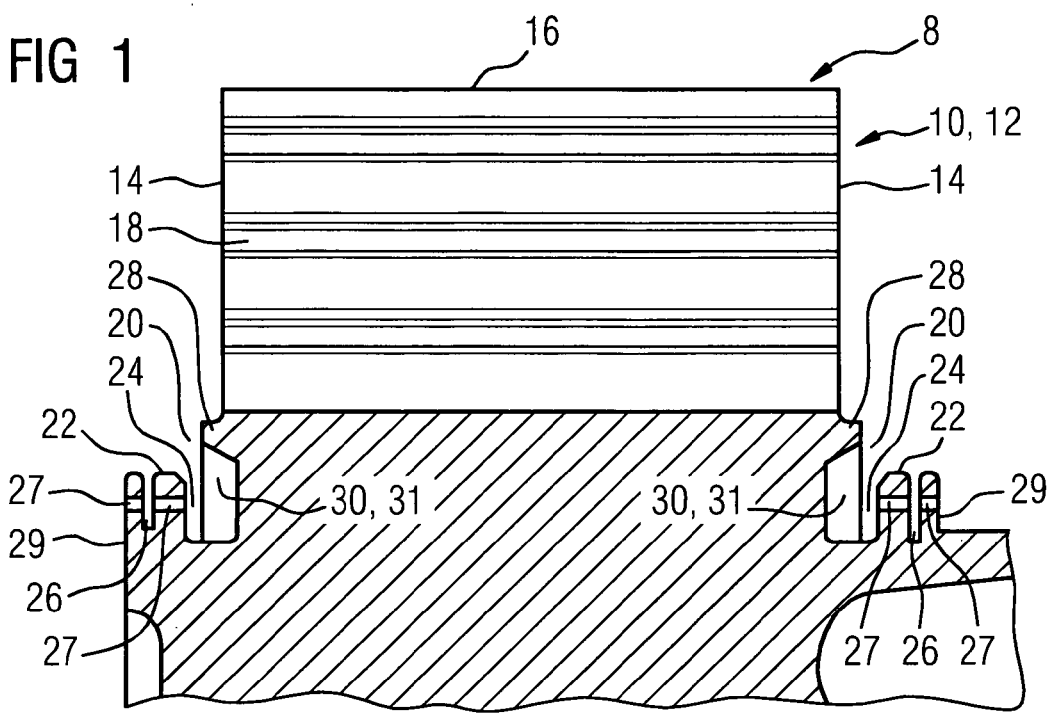
FIG. 1 shows the cross section through the outer circumference of a rotor disk for the turbine of a gas turbine.

FIG. 1 shows the cross section through the outer area 8 of a rotor disk 10 according to the invention, which represents an axial section 12 of the turbine rotor. The rotor disk 10 has a hub hole, which is not shown, for holding the central tie rod. The outer area 8 of the rotor disk 10 is formed by two opposite end first side surfaces 14, which are connected to one another by a circumferential surface 16. A plurality of rotor blade holding grooves 18 are distributed uniformly along the circumference. The section through the rotor disk 10 is in this case located such that it runs through one of the rotor blade holding grooves 18 which are provided in the circumferential surface 16. Each rotor blade holding groove 18, which has a cross section in the form of a fir tree, extends in the axial direction of the rotor and is in this case open both radially outwards and axially at the end. The rotor blade holding groove 18 is intended to hold one rotor blade of the turbine.

In the illustrated example, further circumferential surfaces 22 are provided adjacent to, but radially further inwards than, the two first side surfaces 14. By way of example, as illustrated on the left for the rotor disk 10, the circumferential surface 22 may be formed by a step. A sealing groove 24 which is open radially outwards and extends in the circumferential direction is provided in the circumferential surface 22. An endlessly circumferential end projection 28 is provided in or above the opening 26 of each sealing groove 24 and in each case at least partially covers the opening 20 of the sealing groove 24 in the axial direction, forming an undercut 30. The projection 28 has a contact surface 31 pointing towards the sealing groove 24.

A likewise endless circumferential securing groove 26 is provided, adjacent to the sealing groove 24, in every other circumferential surface 22. Securing plates—which will be described later—are fitted in this securing groove 26 and are used to secure bolts and sealing elements. Holes 27 are provided for the bolts, extend in the axial direction of the rotor and each pass through the side walls of the securing groove 26 and one of the side walls of the sealing grove 24. The drilled holes 27 in this case also each extend through second side surfaces 29 of the rotor disk 10.

Both the sealing groove 24 and the securing groove 26 may also be formed by projections which project upwards, rather than by a step, with these projections being provided on a balcony. This is illustrated on the right-hand side of the rotor disk 10 in FIG. 1.

Figure 2:
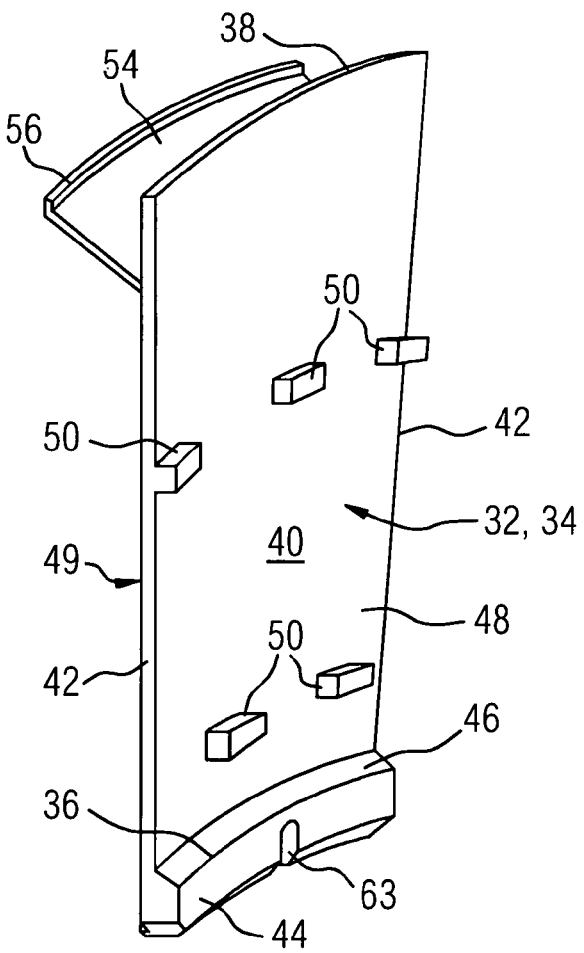
FIG. 2 shows a perspective illustration of a sealing element in the form of a plate.

Each sealing groove 24 is intended to hold sealing elements 32, which are shown in the perspective illustration in FIG. 2. The sealing element 32 comprises an essentially quadrilateral base body 34 which is in the form of a plate and has a center area 40 between an inner edge 36, which is provided radially inwards in an operating position, and an outer edge 38, which is provided radially outwards in an operating position. The center area 40 is formed by two side walls 48, 49 which are essentially at the same constant distance from one another, that is to say the wall thickness of the center area 40 is essentially constant. The inner edge 36 and the outer edge 38 are connected to one another via two straight side edges 42. The inner edge 36 has a bead-like widened area 44 with respect to the center area 40, forming a contact surface 46 which points outwards. The widened area 44 and the contact surface 46 extend over the entire length of the inner edge 36 running in the circumferential direction, and therefore run without any interruption between the two side edges 42.

The widened area 44 is in this case provided only on that side wall 48 of the sealing element 32 which is opposite the first side surface 14 of the rotor section 12 in an operating position. On the side wall 49 of the sealing element 32 facing away from the first side surface 14, the center area 40 merges into the inner edge 36 without any offset.

Furthermore, a plurality of spacers 50 are provided on the sealing element 32 and are separated from one another both in the circumferential direction and in the radial direction. In this case, these are arranged on that side wall 48 of the sealing element 32 which faces the first side surface 14 of the rotor section 12.

An overhang 54, which extends transversely with respect to the radial direction, is provided in the area of the outer edge 38 on that side wall 49 of the sealing element 32 which faces away from the first side surface 14 of the rotor section 12. The overhang 54 in this case has a sealing tip 56 which runs in the circumferential direction and points outwards.

Furthermore, the sealing element 32 has a recess 63 for holding a securing element in the area of the inner edge 36. In this case, the recess 63 is arranged such that it does not interrupt the outer contact surface 46 of the widened area 44. The recess 63 is preferably in the form of a blind hole and is arranged only on that side wall 49 which faces away from the first side surface 14 of the rotor disk 10.

Figure 3:
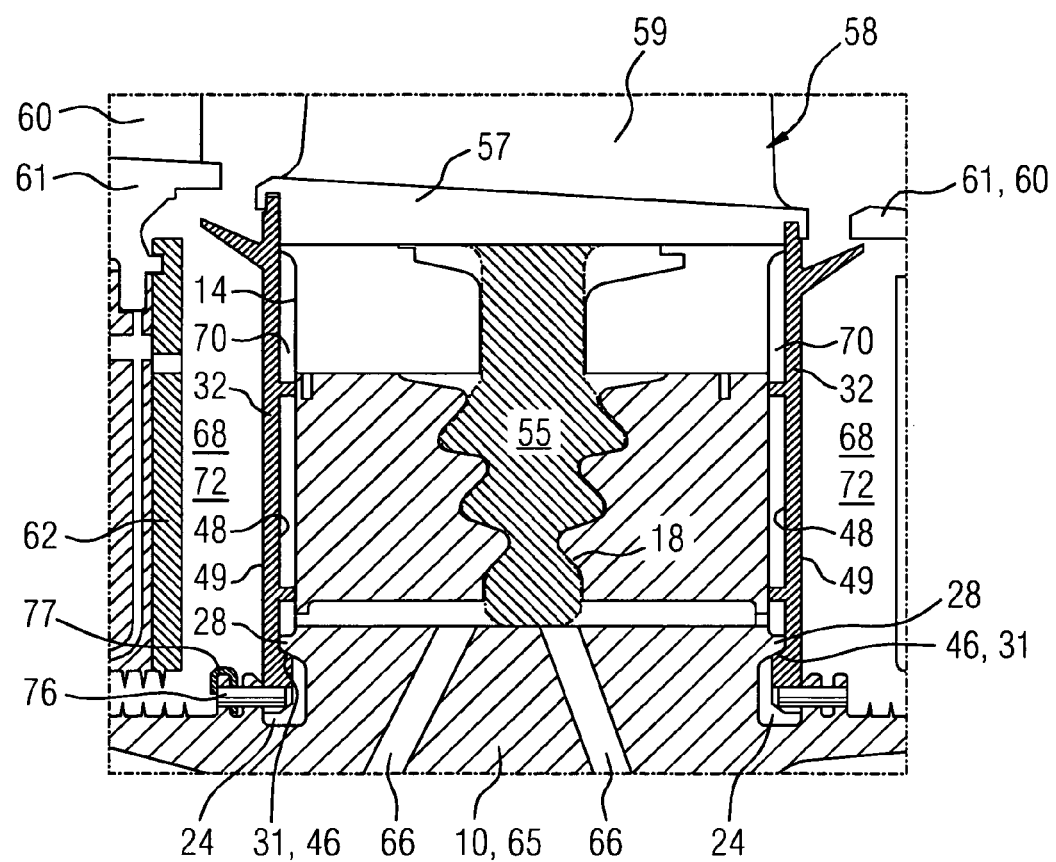
FIG. 3 shows the cross section through the rotor of the gas turbine with a turbine rotor blade inserted and with sealing elements arranged at the end.

Like FIG. 1, FIG. 3 shows the cross section through the outer area of a rotor disk 10, also illustrating a rotor blade 58 arranged in a rotor blade holding groove 18. The rotor blade 58 has a rotor-end foot 55, to which a platform 57 and, adjacent to it, an aerodynamically profiled blade section 59 are integrally connected.

The foot 55 of the rotor blade 58 has a fir-tree-shaped cross section and corresponds to the fir-tree shape of the rotor blade holding groove 18. The schematic illustration of the contour of the rotor blade foot 55 and that of the rotor blade holding groove 18 is shown rotated through 90° with respect to the rest of the illustration in FIG. 3. The rotor blade holding groove 18 illustrated in FIG. 3, and as illustrated more correctly in FIG. 1, therefore also extends between the two first side surfaces 14 of the axial rotor section 12.

Furthermore, head ends 61 of stator blades 60 are indicated schematically and, considered in the flow direction of the working medium of the gas turbine, are arranged upstream and downstream of the rotor blades 58. The guide vanes 60 are in this case arranged on the form of rays in rings. The stator blades 60 in each ring are stabilized by an attachment ring 62 provided at the head end. The attachment ring 62 completely surrounds the rotor 65 of the gas turbine, and is supported by the stator blades 60, which do not rotate. The attachment ring 62 is in this case arranged in a free space 68 which is located between the first side surfaces 14 of adjacent rotor discs 10.

The rotor blade 58 is secured against axial movement within the rotor blade holding groove 18 by means of sealing elements 32 which are inserted into the sealing grooves 24 on both sides of the rotor disk 10.

The free space 68 subdivided into two areas 70, 72 by the sealing element 32. The first area 70 is bounded axially by the side wall 48 of the sealing element 32 and by the first side surface 14, opposite the side wall 48, of the rotor section 12. The second area 72 corresponds to the remaining free space 68, and is partially bounded by the side wall 49 of the sealing element 32.

Furthermore, cooling channels 66 for carrying coolant are provided in the rotor disk 10.

Four different refinements of the invention will be described in the following text, with identical components in the various refinements being provided with the same reference numbers. According to the numbering of the refinement one to four, the respective reference numbers are also provided with a corresponding suffix a to d, to identify the refinement.

A pair comprising a securing plate 77 and a bolt 76 that is used for this purpose are described for each refinement.

FIG. 4 shows a resilient securing plate 77a according to a first refinement. The securing plate 77a is U-shaped with two freely ending plate limbs 79a, 80a, with a hole 81a for the respective bolt 76a being provided in each of the plate limbs 79a, 80a. The two plate limbs 79a, 80a are connected to one another via a web 84a, and are positioned at a slight angle to one another, so that the two holes 81a provided therein are not aligned with one another.

As shown in FIG. 5, the two plate limbs 79a, 80a have different dimensions, differing by the amount Δh. This dimension also corresponds to the shift between the two holes 81a in the unstressed securing plate 77a.

The bolt 76a illustrated in FIG. 6 can be jointly fitted in the rotor disk 10 in conjunction with the sealing plate 77a as shown in FIG. 4, in order to secure the sealing element 32. The bolt 76a has an axial extent between two bolt ends 82a, 83a, with the first end 82a being provided with a chamfer 85a, in order to allow it to be fitted better. The second end 83a is provided with a circumferential annular groove 87a.

FIG. 7 shows a cross section through a detail of the axial rotor section 12, in which the securing plate 77a as shown in FIG. 4 is fitted with a bolt 76a as shown in FIG. 6. A step is provided in the rotor disk 10, in which the hole 27 that extends in the axial direction is provided, and ends in a side wall of the sealing groove 24. For fitting, in addition to the sealing element 32, the securing plate 77a with its plate limb 79a must additionally be fitted in the sealing groove 24. In the process, care should be taken to ensure that the hole 27, the holes 81a and the recess 63 provided in the sealing element lie on one imaginary axial line. Because of the two holes 81a, which are offset with respect to one another, in the securing plate 77a the holes 81a, 27 are on different radii with respect to the rotor rotation axis. The sealing element 32 which has been inserted in the sealing groove 24 can then be moved outwards, that is to say raised. The bolt 76a is then passed through the hole 81a in the other plate limb 80a, and is then inserted in the hole 27. In order to make it easier to insert the bolt 76a, an auxiliary force $F_{assy}$ pointing inwards can act on the connecting rod 84a of the U-shaped securing plate 77a, in order to bend it resiliently. The bending of the resilient securing plate 77a results in all the holes 81a, 27 being moved to the same radius of the rotor, so that the bolt 76a can be inserted further without any problems. Once the bolt 76a has reached its operating position as shown in FIG. 7, and the auxiliary force $F_{assy}$ has been removed, the plate limb 79a of the securing plate 77 can spring back into the annular groove 87 provided on the bolt 76a, so that the bolt 76a is secured against radial movement owing to the interlock between the annular groove 87a and the plate limb 79a. The securing plate 77a is itself held by the bolt 76a.

This even prevents centrifugal forces that occur during operation from being able to release the bolt 76a from its interlock. On the contrary, the centrifugal force acting on the sealing plate 77a prevents the interlock between the bolt 76a and the securing plate 77a from being released.

In order to remove the first sealing element 77a, as shown in FIG. 4, this just has to be elastically deformed by a force $F_{assy}$ directed radially inwards, until the interlock between the securing plate 77a and the bolt 76a is released in the area of the annular groove 87a. The bolt 76a can then be removed from the hole 27, followed by the securing plate 77a and the sealing element 32. It is, of course, also possible to fit the security plate 77a in the securing groove 26.

A second refinement of the securing plate 77b is illustrated in FIG. 8. The sealing element, which is formed essentially from two plate limbs 79b, 80b arranged at right angles to one another before fitting, has only one hole 81b in one of the two plate limbs 79b. The other of the two plate limbs 80a is tapered, and is therefore in the form of a tongue. The bolt 76b to be used for this securing element 77b is shown in a perspective illustration in FIG. 9. This is also provided with a chamfer 85b at its first end 82b. At its opposite end 83b, the bolt 76b is just cylindrical and, at the end, has a blind hole 89b with a thread for an extractor.

FIGS. 10 and 11 illustrate the fitting of the securing plate 77b and the bolt 76b. In contrast to the first refinement shown in FIG. 7, the step which is provided to form the sealing groove 24 is slotted in the circumferential direction, by which means the securing groove 26 is formed. The securing groove 26 is intended to hold the securing plate 77b as shown in FIG. 8. For fitting, that plate limb 79b of the securing plate 77b in which the hole 81b is provided inserted into the securing groove 26. In the process, care must be taken to ensure that the hole 81b is aligned with the hole 27. The sealing element 32 which has been inserted into the sealing groove 24 is then raised so that its recess 63 is opposite the hole 27. The bolt 76b is then pushed into the hole 27 and through the hole 81b until the first end 82b of the bolt 76b engages in the recess 69 in the sealing plate 32. The bolt 76b is preferably pushed in until its second end 83b is completely recessed in the hole 27. The second plate limb 80b is then bent radially inward by application of a fitting force F pointing radially inwards, until the previously free limb 80 covers the end opening of the hole 27, and blocks the bolt 76b against movement along the hole 27 (FIG. 11). In order to ensure that the plate limb 79b, which is provided with the hole 81b, is held securely during the plastic deformation of the tongue-like plate limb 80b, the securing plate 77b is not, in contrast to the solution shown in FIG. 7, also inserted in the sealing groove 24, but in the securing groove 26. The side walls of the securing groove 26 are used as an opposing bearing for the bending process. In order to remove the securing plate 77b for the bolt 76b and for the sealing element 32, the plate limb 79b, which blocks the hole 127 just has to be bent up by means of a flat bar. The bolt 76b can then be removed from the hole 27, resulting in the sealing element 32 becoming accessible.

Figure 12:
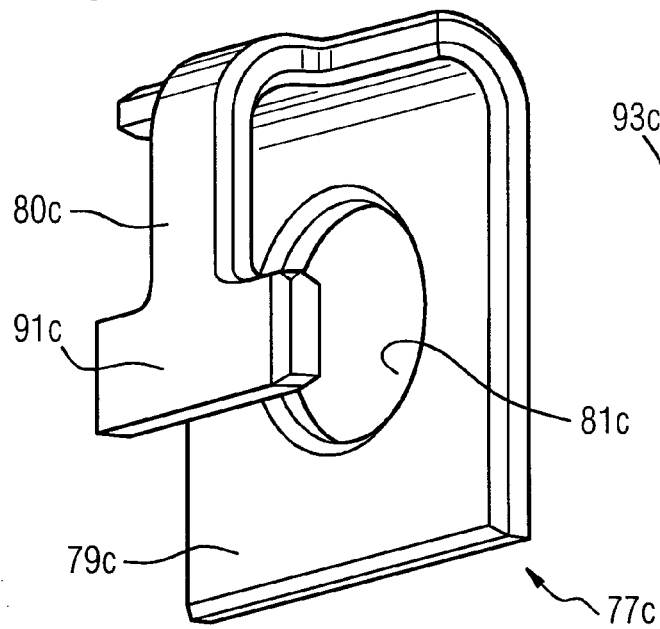
FIG. 12 shows a perspective illustration of a third refinement of a securing plate.
Figure 13:
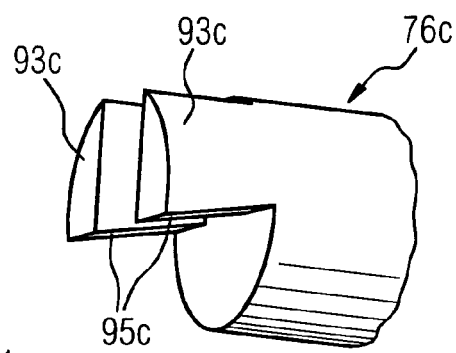
FIG. 13 shows a perspective illustration of the bolt to be inserted in conjunction with the securing plate as shown in FIG. 12.
Figure 14:
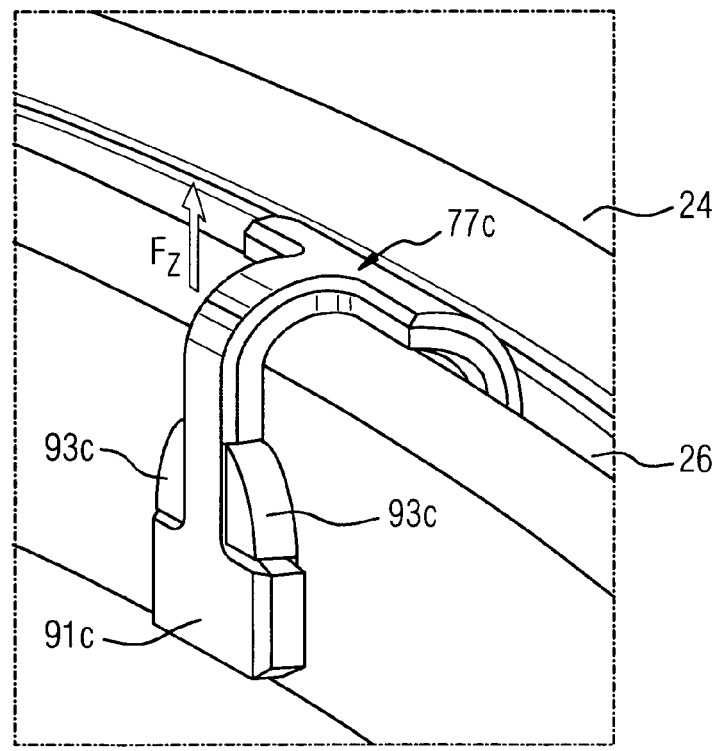
FIG. 14 shows an assembled illustration of the securing plate as shown in FIG. 12 and of the bolt, inserted in the rotor disk, as shown in FIG. 13.

A third refinement of a securing plate 77c and of the bolt 76c is illustrated in perspective form in FIGS. 12 and 13 and in the installed state in FIG. 14, with the reference symbols of known elements now being provided with the suffix c.

The securing plate 77c shown in FIG. 12 and its fitting are essentially identical to those from FIG. 8. In the illustration in FIG. 12, it is shown in the state in which it has already been bent around. However, this differs in its free plate limb 80c, which must be bent around in order to fit and to secure the bolt 76. This plate limb 80c first of all extends like a tongue, starting from the first plate limb 79c, and then ends with a broadened hammerhead 91c. The bolt 76c is likewise slightly modified in comparison to the bolt 76b. Instead of the blind hole 89b at the end, two projections 93c are provided on the bolt 76c, and are at a distance from one another. In this case, in the fitted state, the gap which is formed by the two projections 93c holds the tongue-like section of the securing plate 77c, and the hammerhead 91c on the securing plate 77c engages behind the two projections 93c, as is illustrated in FIG. 14.

The projections 93c also have inclined surfaces 95c, which are provided for contact with the hammerhead 91c. In this case, the surfaces 95c are inclined such that the securing plate 77c, which tries to move outwards under the influence of centrifugal force $F_z$, is hooked to the bolt 76c in such a way that the plate limb 80c, which is bent around during fitting, is moved towards the side surface and towards the rotor disk 10 as a result of the inclination of the projections 93c. The bolt 76c and the associated securing plate 77c are in this case preferably designed such that a minimum friction force between the bolt 76c and the securing plate 77c must be overcome in order to open the interlock between the hammerhead 91c and the projection 93c. This allows the securing plate 77c and the bolt 76c to be fitted particularly securely and reliably.

Figure 15:
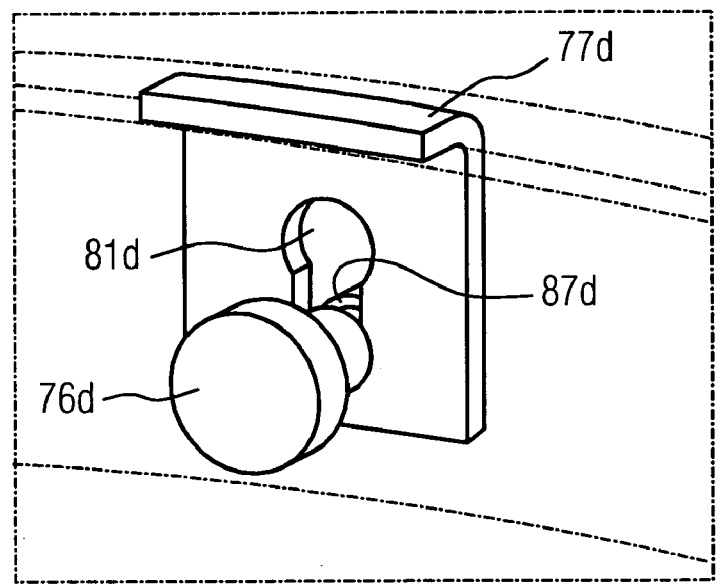
FIG. 15 shows a perspective illustration of a fourth refinement of a securing plate.
Figure 16:
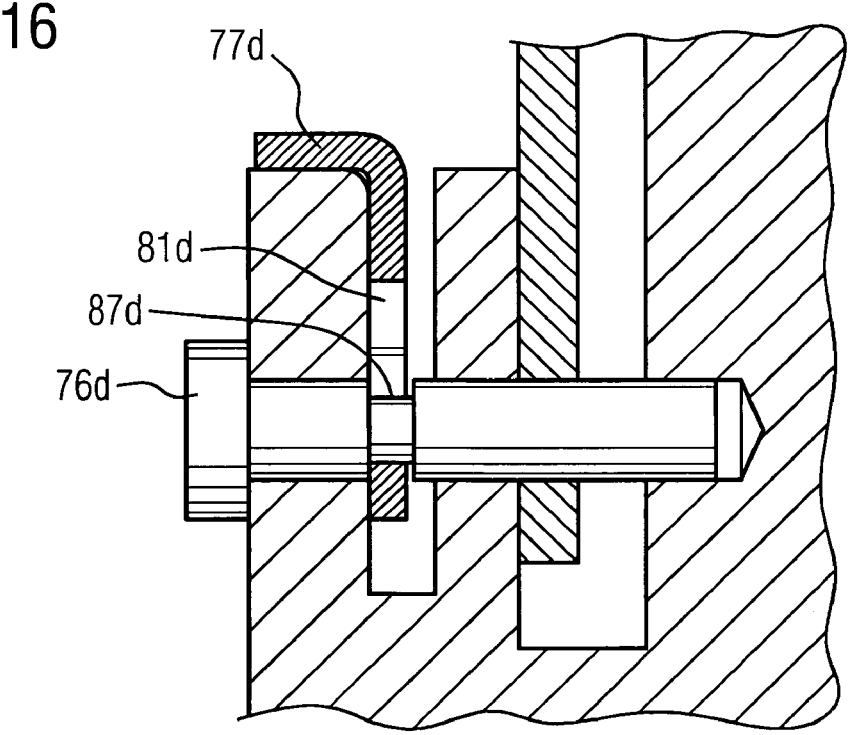
FIG. 16 shows the securing plate designed as shown in FIG. 15, in the installed state.

FIGS. 15 and 16 illustrate a fourth and final refinement of a securing plate 77. The securing plate 77d is essentially in the form of a plate and has an opening in the form of a keyhole with a smaller diameter and a larger diameter. The bolt 76d to be used with this securing plate 77d requires only one annular groove 87d, which is positioned when the bolt 76d is fitted in such a way that it is in the area of the securing groove 26. In order to fit the bolt 76d and the securing plate 77b, the last-mentioned must first of all be inserted into the securing groove 26. In this case, care must be taken to ensure that the holes 81d in the securing plate 77d are aligned with the hole 27 that is located in the rotor disk. The bolt 76d can then be inserted into the hole 27 and can be moved in depth into it until its annular groove 87d is located in the securing groove 26. The securing plate 77d can then be raised so that its smaller diameter engages in the annular groove 87d, and blocks the bolt against axial movement. The securing plate 77d, which is still flat, is then bent around so that the section which projects from the securing groove 26 comes to rest on the circumference of the rotor disk 10 (FIG. 16).

Overall, the invention makes it possible to specify an axial rotor section 12 for a rotor of a turbine in which a sealing element 32 which is provided on an end side surface 14 is secured against movement in the circumferential direction by means of a bolt 76, with the bolt 76 being secured reliably by means of a securing plate 77 against becoming loose. One particular advantage of the invention is the comparatively simple and cost-effective design comprising a securing plate 77, a bolt 76, holes and grooves 24, 26. Furthermore, these components can be fitted and removed quickly because of their simple geometry.

The invention claimed is:

1. An axial rotor section for a rotor of a turbine, comprising:
an outer circumferential surface adjacent to two end first side surfaces in which rotor blade holding grooves for rotor blades of the turbine are distributed over the circumference and extend in an axial direction of the turbine;
a further circumferential surface arranged radially further inwards relative to the outer circumferential surface and is adjacent to one of the two first side surfaces, wherein at least one sealing groove is provided with the further circumferential surface is open radially outwards, extends in the circumferential direction and has a plurality of sealing elements which are inserted therein and at least partially cover the end openings of the rotor blade holding grooves, wherein each sealing grove has associated side walls;
a second side surface arranged adjacent to the further circumferential surface and with a hole for each sealing element being provided in the second side surface and passing through at least one of the side walls of the sealing groove, extending in the axial direction, with each sealing element being secured against movement in the circumferential direction by a bolt seated in the hole;
a bolt securing device that secures each bolt against movement along the hole wherein the bolt securing device comprises a securing plate having at least one hole aligned with one of the holes in the side walls of the sealing groove such that the bolt inserted into the respectively aligned holes secures the securing plate against loosening; and
a securing groove arranged in the further circumferential surface and is adjacent to the sealing groove and in which the securing plates are inserted.

2. The rotor section as claimed in claim 1, wherein the securing plate is partially bent around a section of the further circumferential surface.

3. The rotor section as claimed in claim 2, wherein the securing plate, in the bent-around state, at least partially covers the hole which is arranged in the second side surface and in which the bolt is seated.

4. The rotor section as claimed in claim 2, wherein one end of the bolt projects partially out of the hole in the second side surface and is connected to the securing plate by an interlock.

5. The rotor section as claimed in claim 4, wherein the projecting end face of the bolt is comprises at least one projection, behind which the end of the securing plate which engages the corresponding projection.

6. The rotor section as claimed in claim 5, wherein a minimum friction force between the bolt and the securing plate must be overcome in order to open the interlock.

7. The rotor section as claimed in claim 1, wherein the securing plate is U-shaped with two freely ending plate limbs with a hole for the respective bolt being provided in each plate limb.

8. The rotor section as claimed in claim 7, wherein the hole in the securing plate has an opening in the form of a keyhole with a smaller and a larger diameter, and in which the bolt has an external diameter which is larger than the larger diameter of the keyhole and is provided with an endlessly circumferential annular groove in which the keyhole in the securing plate engages.

9. The rotor section as claimed in claim 2, wherein the rotor section is a rotor disk.

* * * * *